(12) United States Patent
Kikuchi et al.

(10) Patent No.: US 12,416,501 B2
(45) Date of Patent: Sep. 16, 2025

(54) LOAD TRANSPORT SYSTEM AND TRANSPORTER

(71) Applicant: Panasonic Intellectual Property Management Co., Ltd., Osaka (JP)

(72) Inventors: Kohei Kikuchi, Osaka (JP); Yumiko Kato, Osaka (JP); Yasuhisa Inada, Osaka (JP); Kazuya Hisada, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 146 days.

(21) Appl. No.: 18/447,359

(22) Filed: Aug. 10, 2023

(65) Prior Publication Data

US 2023/0384100 A1 Nov. 30, 2023

Related U.S. Application Data

(63) Continuation of application No. PCT/JP2021/042151, filed on Nov. 17, 2021.

(30) Foreign Application Priority Data

Mar. 9, 2021 (JP) ................................. 2021-037285

(51) Int. Cl.
*G01C 21/20* (2006.01)
*G05D 1/00* (2024.01)

(52) U.S. Cl.
CPC ......... *G01C 21/206* (2013.01); *G05D 1/0214* (2013.01)

(58) Field of Classification Search
CPC ....... G05D 1/0297; G05D 1/0214; B65G 1/00
USPC .......................................................... 701/533
See application file for complete search history.

(56) References Cited

U.S. PATENT DOCUMENTS

| | | | |
|---|---|---|---|
| 2019/0243374 A1 | 8/2019 | Ikawa et al. | |
| 2020/0073399 A1 | 3/2020 | Tateno et al. | |
| 2020/0333789 A1* | 10/2020 | Suzuki | G05D 1/0212 |
| 2022/0317704 A1* | 10/2022 | Yoshida | G05D 1/0297 |

FOREIGN PATENT DOCUMENTS

| | | | | |
|---|---|---|---|---|
| JP | 2010-044530 | | 2/2010 | |
| JP | 2019-131392 | | 8/2019 | |
| JP | 2019-529277 | | 10/2019 | |
| JP | 2020-038631 | | 3/2020 | |
| JP | 2020038631 A | * | 3/2020 | ........... G05D 1/0038 |
| WO | 2018/022264 | | 2/2018 | |

OTHER PUBLICATIONS

International Search Report of PCT application No. PCT/JP2021/042151 dated Feb. 15, 2022.

* cited by examiner

*Primary Examiner* — Navid Z. Mehdizadeh
*Assistant Examiner* — Vincent Feng
(74) *Attorney, Agent, or Firm* — Rimon P.C.

(57) ABSTRACT

A load transport system includes multiple transporters transporting a load. The transporters include a first transporter and a second transporter. The second transporter measures a size of the first transporter and outputs size information on the size of the first transporter to outside. The first transporter acquires the size information and makes a travel plan of the first transporter in accordance with the size information.

18 Claims, 13 Drawing Sheets

LOAD TRANSPORT SYSTEM AND TRANSPORTER

BACKGROUND

1. Technical Field

The present disclosure relates to a load transport system, transporting a load, and a transporter.

2. Description of the Related Art

Load transport systems including an unmanned transporter transporting a load are disclosed. For example, Japanese Patent No. 5255366 discloses a transporter in a load transport system that measures a load placed on the transporter with a sensor secured on the transporter and makes a travel plan thereof. Japanese Patent No. 5255366 also discloses a transporter that measures a load placed on the transporter with a sensor, mounted on the transporter during traveling, and makes a travel plan thereof.

SUMMARY

If the transporter measures a load placed thereon using the sensor mounted on the transporter or using the sensor mounted on the transporter during traveling, a size of the load may be difficult to measure precisely. If the size of the load is difficult to measure precisely, the transporter may be unable to appropriately travel through the travel route.

One non-limiting and exemplary embodiment provides a load transport system that allows a transporter transporting a load to appropriately travel through a travel route.

In one general aspect, the techniques disclosed here feature a load transport system including a plurality of transporters transporting a load and including a first transporter and a second transporter, wherein the second transporter measures a size of the first transporter and outputs, to outside, size information on the size of the first transporter, and wherein the first transporter acquires the size information and makes a travel plan of the first transporter in accordance with the size information.

According to the load transport system of the embodiment of the disclosure, the transporter transporting the load may appropriate travel through the travel route.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Underlying Knowledge Forming Basis of the Present Disclosure

The underlying knowledge forming basis of the present disclosure is described with reference to FIGS. 1 through 3.

Information on the size of a transporter, such as a width, a depth, and a height of the transporter, is used for the transporter transporting a load to appropriately travel through a travel route. The information on the size of the transporter includes not only the size of the transporter alone but also the transporter with a load placed thereon. For example, if the load is placed on the transporter with the load protruded in the direction of width of the transporter, information on not only the transporter but also the load may be used. A load transport system makes a travel plan of the transporter in response to information on the size including the load.

Figure 1:
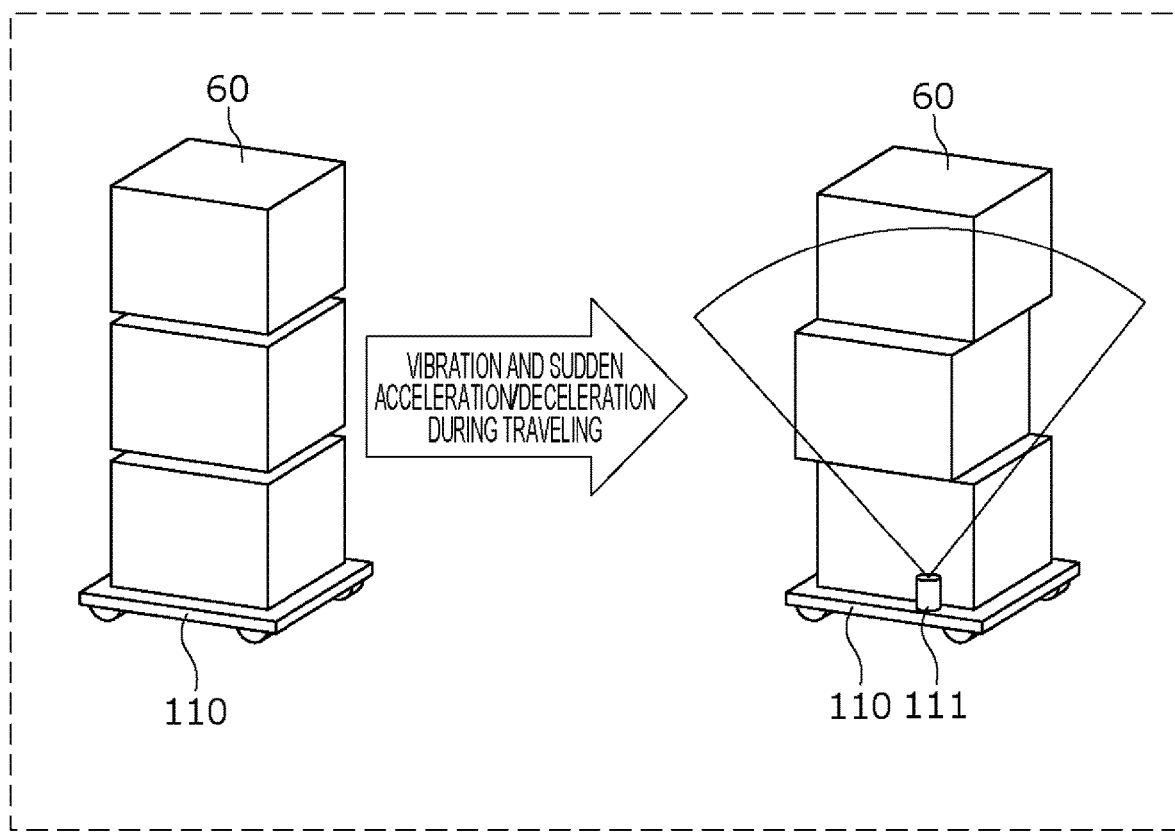
FIG. 1 schematically illustrates a transporter as a first comparative example.

FIG. 1 illustrates a transporter 110 as a first comparative example. The transporter 110 as the first comparative example measures a load 60 loaded thereon using a sensor 111. For example, if a larger vibration or a sudden acceleration/deceleration occurs during the traveling of the transporter 110, multiple loads 60 may be displaced in position on the transporter 110. Referring to the first comparative example, a method of measuring the size of the transporter 110 using the sensor 111 mounted on the transporter 110 is likely to be affected by a blind spot and it may be difficult to precisely measure the size of the transporter 110 having the loads 60 loaded thereon.

Figure 2:
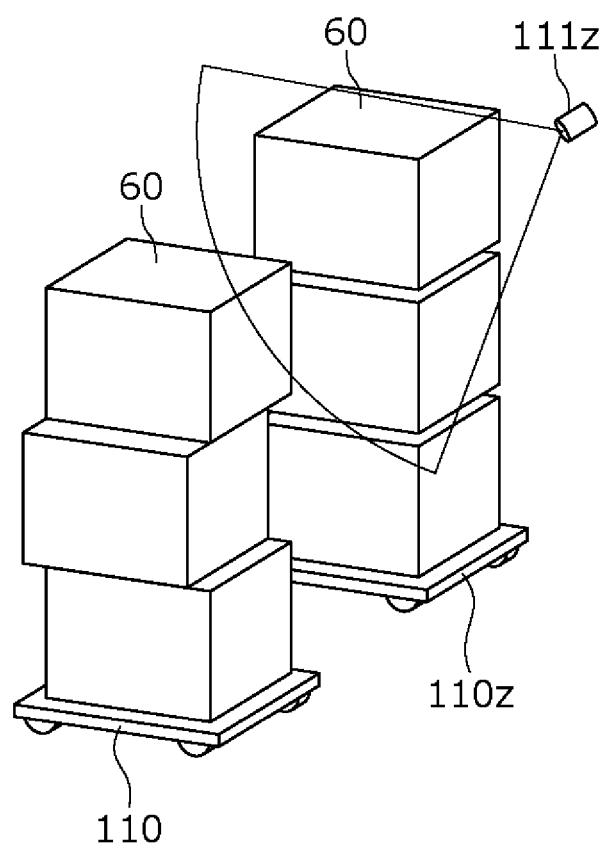
FIG. 2 schematically illustrates a transporter as a second comparative example.

FIG. 2 schematically illustrates a transporter 110 as a second comparative example. The transporter 110 as the second comparative example measures the loads 60 loaded thereon using a secured sensor 111z secured to a wall or ceiling. Referring to the second comparative example, a method of measuring the size of the transporter 110 using the secured sensor 111z is applied. If another transporter 110z is present between the secured sensor 111z and the transporter 110, the method may have difficulty in detecting the size of the transporter 110 to be measured.

Figure 3:
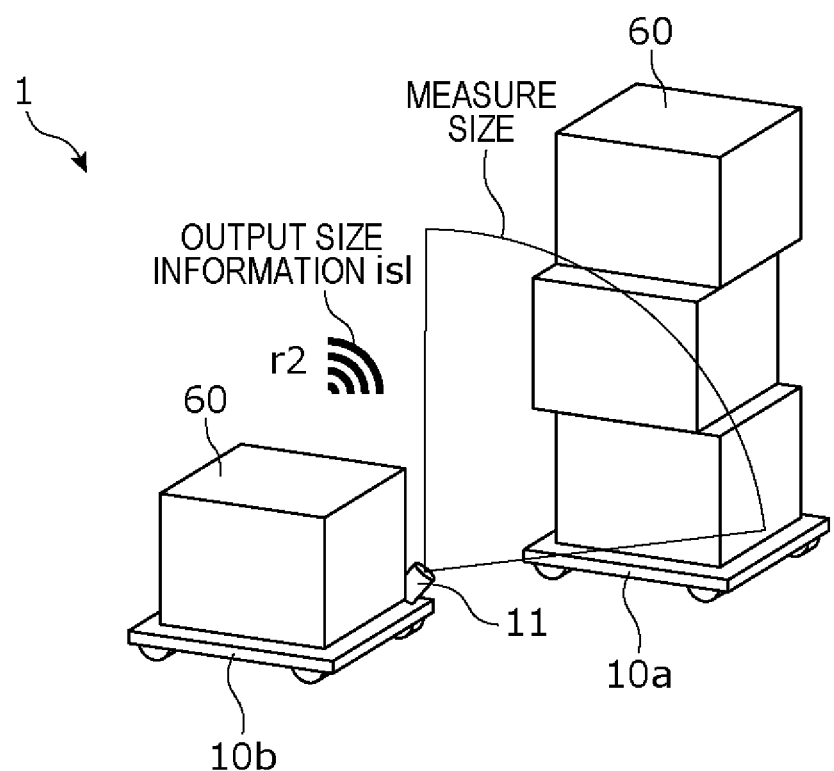
FIG. 3 schematically illustrates a transporter of an embodiment.

FIG. 3 schematically illustrates transporters 10a and 10b of the embodiment. A load transport system 1 of the embodiment measures the size of the transporter 10a using a measurer 11 of another transporter 10b different from the transporter 10a. The load transport system 1 makes a travel plan of the transporter 10a in accordance with the measurement results. In this way, the transporter 10a may appropriately travel through a travel route.

The embodiment is described with reference to the drawings. The embodiment described below is a general or specific example. Numerical values, shapes, materials, elements, layouts of the elements, locations and connection configurations of the elements, steps, orders of the steps are recited for exemplary purposes only and are not intended to limit the disclosure. From among the elements in the embodiment, an element not recited in an independent claim may be construed as an optional element.

The drawings are not necessarily drawn to scale. For example, in each drawing, scale is not necessarily consistent. In the drawings, elements substantially identical in configuration are designated with the same reference symbol and the discussion thereof is simplified or not repeated. If the same element is illustrated in the drawings, scale may be changed for convenience.

In the specification, terms representing a relationship between elements, such as "identical," "equal" and "parallel," terms representing the shape of an element, such as "plate-like" and "rectangular," and numerical values and numerical ranges are used not only in a strict sense but also in a substantially equivalent range. For example, the substantially equivalent range may include a difference of a few percent.

Embodiment

1. Configuration of Load Transport System

Configuration of a load transport system 1 of the embodiment is described with reference to FIGS. 4 through 11.

Figure 4:
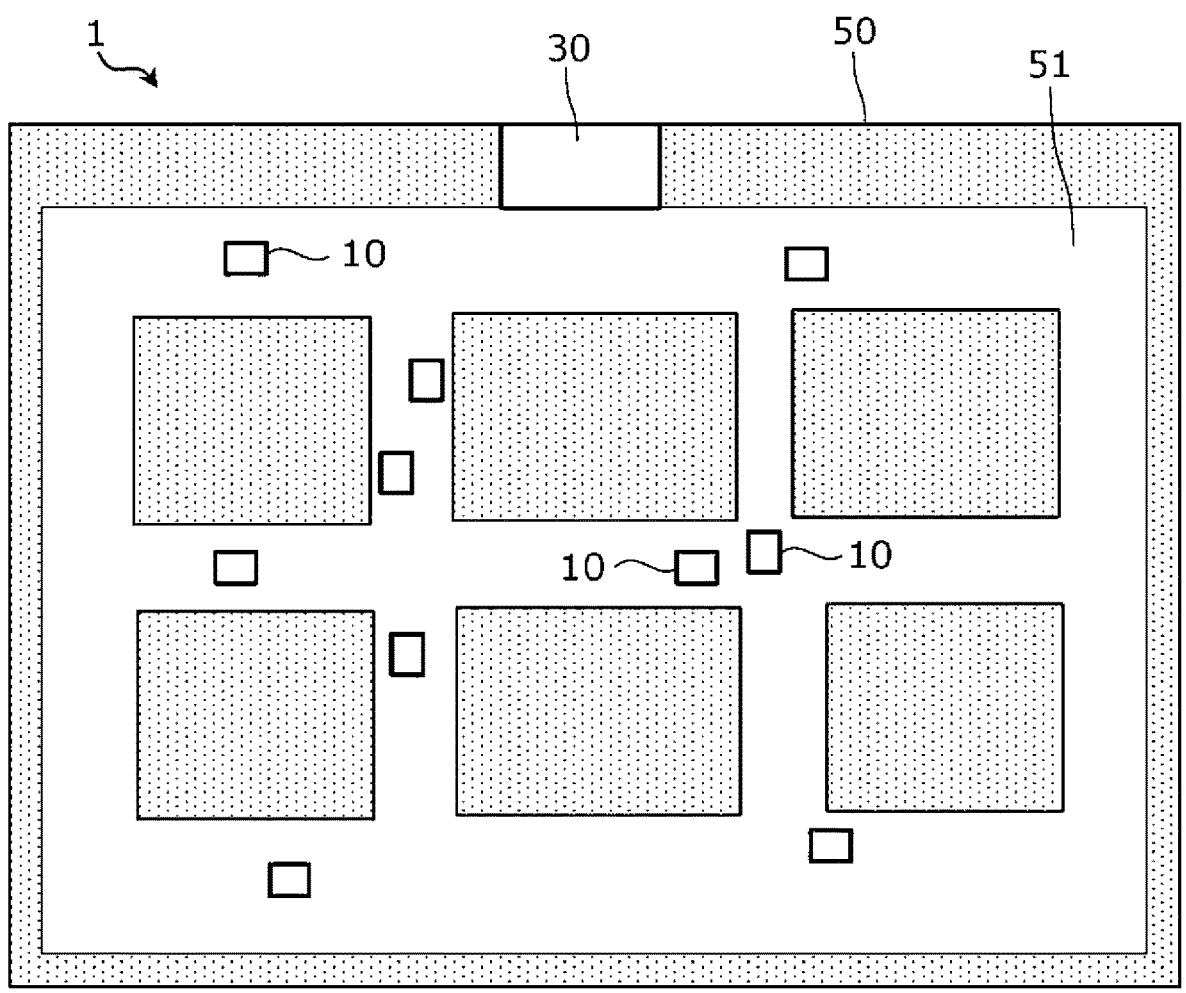
FIG. 4 schematically illustrates a load transport system of the embodiment.

FIG. 4 schematically illustrates the load transport system 1 of the embodiment. Referring to FIG. 4, the load transport system 1 is viewed from the ceiling of a building 50.

As illustrated in FIG. 4, the load transport system 1 includes multiple transporters 10 transporting loads, and a management apparatus 30 managing the transporters 10. For example, the load transport system 1 is installed in a warehouse or a plant. The building 50 is a space surrounded by a wall or a partition. Facilities and shelves are arranged on the floor of the building 50 and a travel route 51 is arranged between the facilities and shelves. The transporters 10 travel through the travel route 51.

FIG. 4 illustrates 10 transporters 10, but two or more transporters 10 may be used or 50 or more transporters 10 may be used. Referring to FIG. 4, the management apparatus 30 is installed in the building 50 but the installation location of the management apparatus 30 is not limited to the building 50. If a radio controller connected to the management apparatus 30 is installed in the building 50, the management apparatus 30 may be installed outside the building 50.

Figure 5:
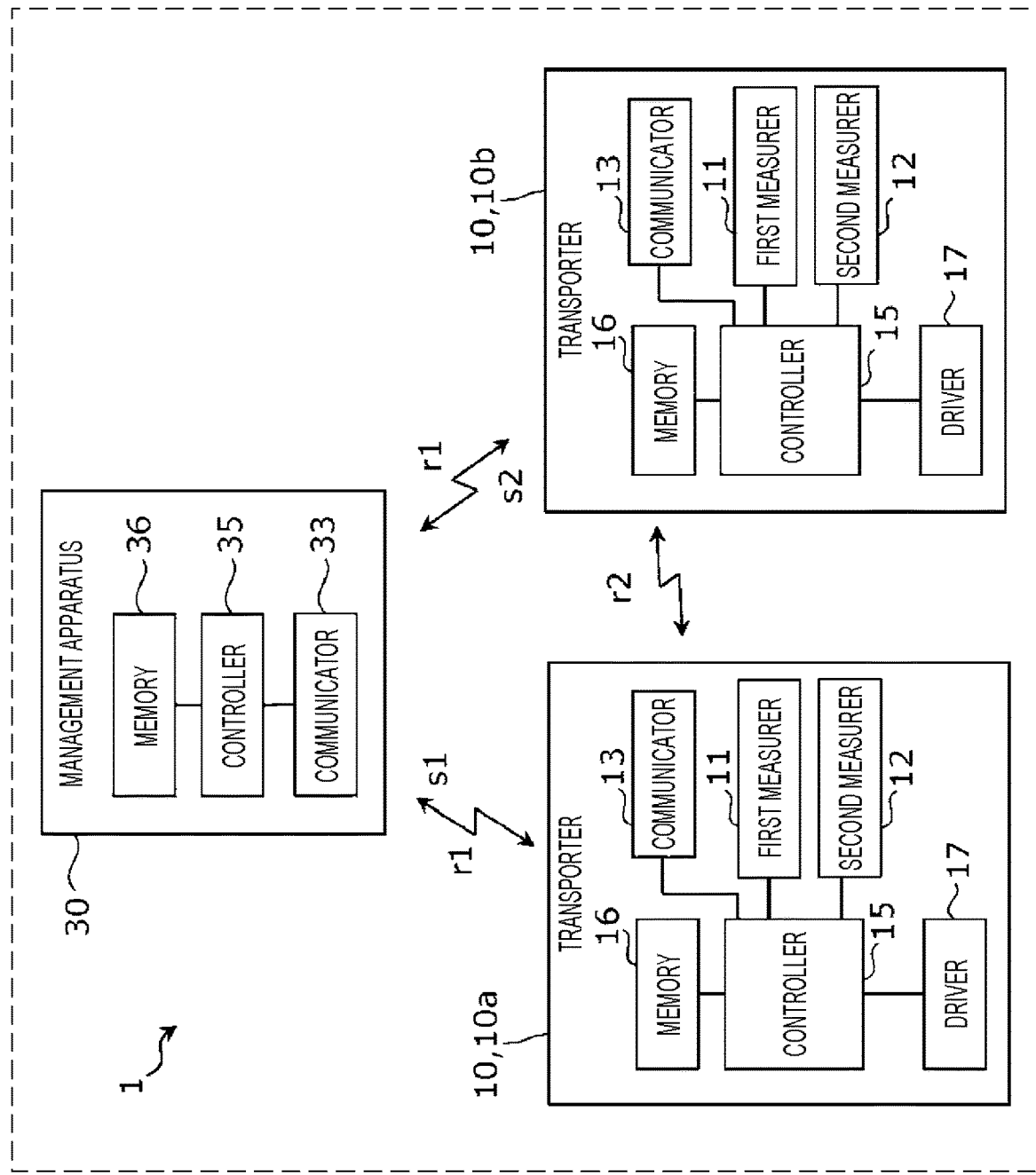
FIG. 5 is a block diagram illustrating the load transport system of the embodiment.

FIG. 5 is a block diagram illustrating the load transport system 1. FIG. 5 representatively illustrate a first transporter 10a as a specific one of the transporters 10 and a second transporter 10b as another transporter different from the specific transporter. In the following discussion, the transporter 10 may represent the first transporter 10a, the second transporter 10b, or both of the first transporter 10a and the second transporter 10b.

As previously described, the load transport system 1 includes the transporters 10 and the management apparatus 30.

The management apparatus 30 is a management server managing the transporters 10. The management apparatus 30 includes a communicator 33, a controller 35, and a memory 36.

The communicator 33 serving as a radio module communicates with the transporter 10 via a radiowave r1. The management apparatus 30 exchanges a variety of information with the transporter 10 via the radiowave r1. Communication method may be specified low-power radio in a frequency in 920 MHz band or 2.4 GHz band, Zigbee (registered trademark), Bluetooth (registered trademark), or WiFi (registered trademark).

The memory 36 is a volatile memory or a non-volatile memory. The memory 36 stores a program that causes the load transport system 1 to operate. The memory 36 also stores a variety of information used to manage the transporter 10.

Figure 6:
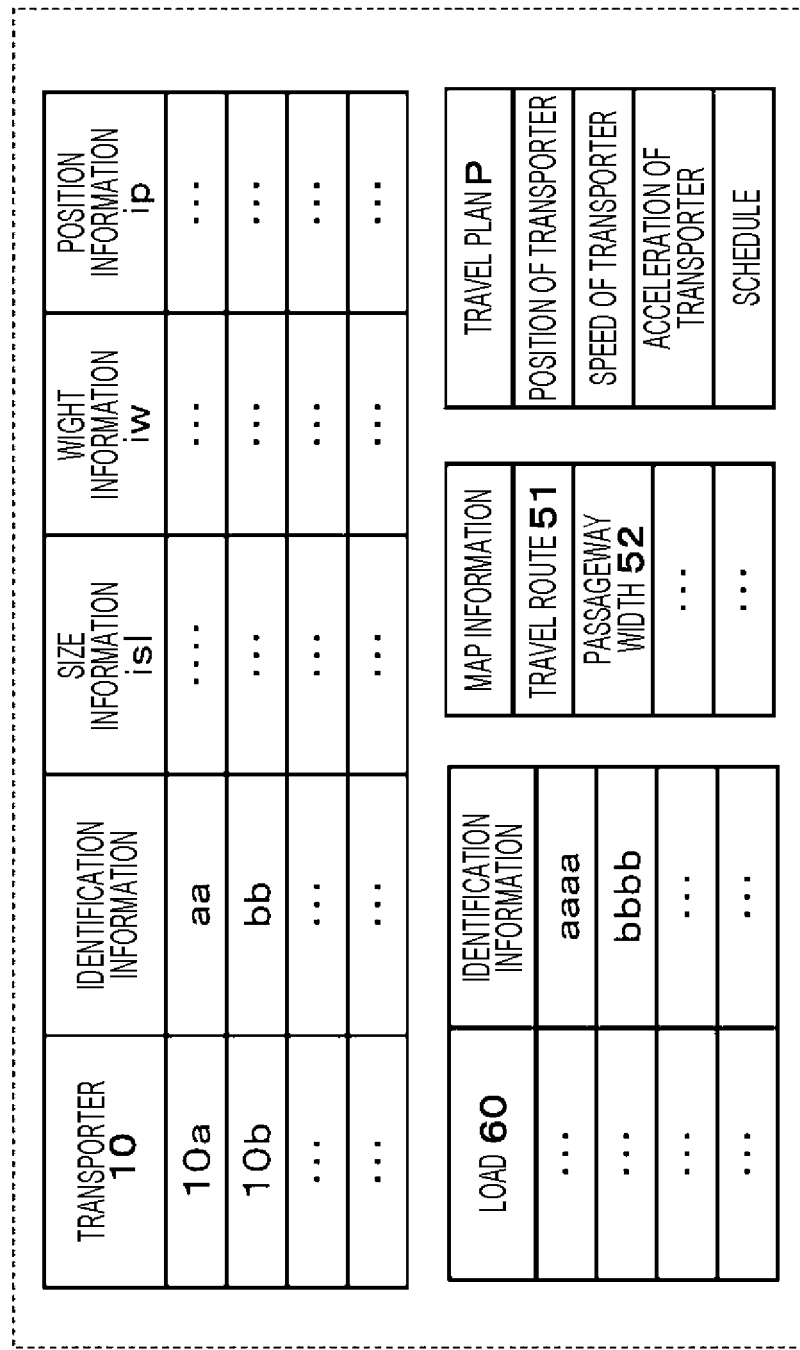
FIG. 6 illustrates an example of information stored on a management apparatus of the load transport system of the embodiment.

FIG. 6 illustrates an example of information stored on the management apparatus 30 in the load transport system 1.

Referring to FIG. 6, the memory 36 in the management apparatus 30 stores identification information (identifier) on each transporter 10, identification information on the load 60, size information isl related to the size of each transporter 10, weight information iw related to the weight of each transporter 10, position information ip on each transporter 10, and map information (layout information) on the building 50. The identification information on the transporter 10 may be a media access control (MAC) address or an address for communication. The weight information iw may include the weight of the transporter 10, the weight of the load 60, and the sum of the weights of the transporter 10 and the load 60.

The identification information, the size information isl, the weight information iw, and the map information are entered beforehand by a user who uses the load transport system 1. The position information ip is stored as appropriate on the memory 36 when position coordinates of the transporter 10 transmitted from the transporter 10 is acquired via the communicator 33.

The memory 36 stores information related to a travel plan P of each transporter 10. The travel plan P includes the position, the travel route 51, track, speed, acceleration and schedule of each transporter 10. The position, the speed and the acceleration of the transporter 10 include information in a width direction and a travel direction of the transporter 10. The controller 35 in the management apparatus 30 makes the travel plan P and stores the travel plan P on the memory 36. The travel plan P may include the identification information, the size information isl, the weight information iw and the position information ip.

The controller 35 may be a processor, such as a central processing unit (CPU). Using a variety of information stored on the memory 36, the controller 35 makes the travel plan P of the transporter 10. The controller 35 exchanges information described below with the first transporter 10a and the second transporter 10b via the communicator 33.

When the controller 35 receives from the first transporter 10a a measurement request signal s1 requesting the size of the first transporter 10a to be measured, the controller 35 transmits a travel instruction signal s2 to the second transporter 10b.

The measurement request signal s1 is transmitted from the first transporter 10a to the management apparatus 30 if a passageway width 52 of the travel route 51 of the first transporter 10a is narrower than a predetermined width. The travel instruction signal s2 is produced in response to the position information ip on the first transporter 10a and includes the position information ip on the first transporter 10a and information related to the travel route 51 along which the second transporter 10b is expected to travel along before reaching the first transporter 10a. The travel instruction signal s2 also includes measurement instruction information causing the second transporter 10b to measure the size of the first transporter 10a. If the first transporter 10a and the second transporter 10b passes each other through a single travel route 51, the measurement request signal s1 is transmitted from the first transporter 10a to the management apparatus 30.

In this way, the management apparatus 30 receives the measurement request signal s1 from the first transporter 10a and transmits the travel instruction signal s2 to the second transporter 10b. Alternatively, the management apparatus 30 may receive the measurement request signal s1 from the second transporter 10b and transmit the travel instruction signal s2 to the first transporter 10a.

Figure 7:
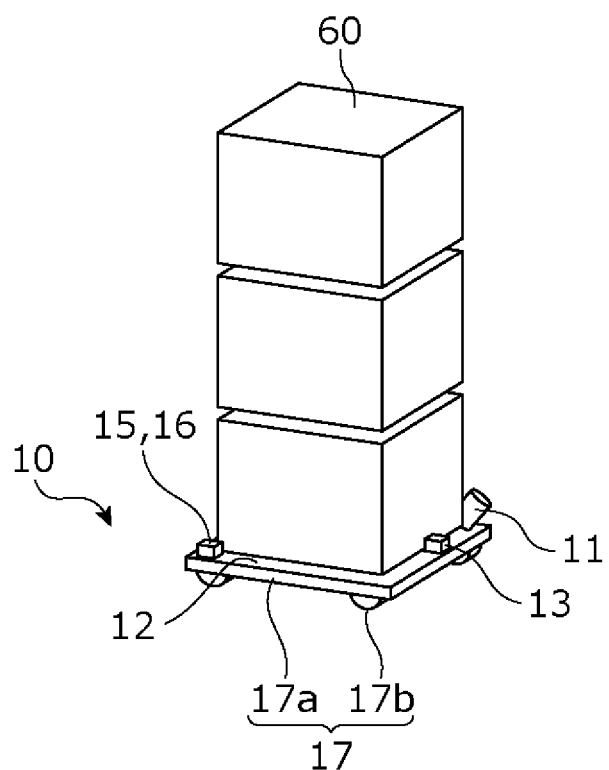
FIG. 7 illustrates a transporter in the load transport system of the embodiment.

FIG. 7 illustrates the transporter 10 in the load transport system 1. FIG. 7 also illustrates multiple loads 60 loaded on the transporter 10.

The transporter 10 is, for example, an autonomous mover and autonomously transports the loads 60 loaded on the transporter 10. The transporter 10 includes a first measurer 11, a second measurer 12, a communicator 13, a controller 15, a memory 16, and a driver 17 (see FIG. 5).

The driver 17 causes the transporter 10 to run. Referring to FIG. 7, the driver 17 includes a base 17a on which the loads 60 are mounted, wheels 17b arranged on the base 17a, and a driving motor (not illustrated) that rotates the wheels 17b. Auxiliary wheels may be arranged on the underside of the base 17a. The driver 17 is controlled in response to an instruction from the controller 35. The transporter 10, driven by the driver 17, performs movements, including forward movement, backward movement, counterclockwise rotation and clockwise rotation. The load 60 may be loaded in a state that the load 60 is protruded from the base 17a.

The first measurer 11 measures the size of the transporter 10. The first measurer 11 includes a range finder mounted on the base 17a. The range finder may be a laser range finder and measures a range to an object by emitting laser light from a laser light source and receiving laser light reflected from the object within a range measurement region.

The second measurer 12 measures a weight of the transporter 10. The second measurer 12 includes a weighting device arranged on the base 17a. The weighting device may be, for example, a load cell and measures a weight of the load 60 loaded on the transporter 10.

The first measurer 11 measures the size of a transporter different from the transporter 10 using the range finder. The first measurer 11 also measures an object on or near the travel route 51 of the transporter 10. The object on or near the travel route 51 may be an obstacle, an unattended load, a shelf or a wall. The range finder may emit laser light and cause laser light to scan one-dimensionally or two-dimensionally or may emit point laser. If the laser light is caused to scan one-dimensionally or two-dimensionally, one or more devices may be employed.

In order to detect position coordinates of the transporter 10 within the building 50, the first measurer 11 measures the wall surrounding the first measurer 11, a shelf, or marks on the floor using the range finder. The first measurer 11 also measures the speed and the acceleration of the transporter 10. The speed of the transporter 10 may be calculated from time-series change in the position acquired by the range finder and the acceleration of the transporter 10 may be calculated from time-series change in the speed acquired by a speed meter. The first measurer 11 may include a speed meter and an accelerometer and measure the speed and the acceleration respectively by the speed meter and the accelerometer.

Measurement data obtained from the first measurer 11 and the second measurer 12 is transmitted to the management apparatus 30 and the like via the controller 15 and the communicator 13 described below. Data on the size of the different transporter measured by the first measurer 11 is transmitted to the different transporter via the controller 15 and the communicator 13.

The communicator 13 is a communication module and communicates with the management apparatus 30 via the radiowave r1. The communicator 13 also communicates with the different transporter via the radiowave r2. Specifically, the first transporter 10a and the second transporter 10b are communicable with each other via the radiowave r2 without using the management apparatus 30. The communication method via the radiowave r2 may be Bluetooth (registered trademark) or WiFi (registered trademark). The first transporter 10a and the second transporter 10b may be designed to be able to communicate via infrared communication or optical communication.

The communicator 13 is able to transmit the measurement request signal s1 to the management apparatus 30 via the radiowave r1. The communicator 13 is able to receive from the management apparatus the travel instruction signal s2 via the radiowave r1. The communicator 13 is able to transmit the size information isl on the different transporter measured by the transporter 10 to the different transporter via the radiowave r2.

The memory 16 described below stores information received from the management apparatus 30 or the different transporter via the communicator 13 and information generated in accordance with the measurements of the first measurer 11 and the second measurer 12.

Figure 8:
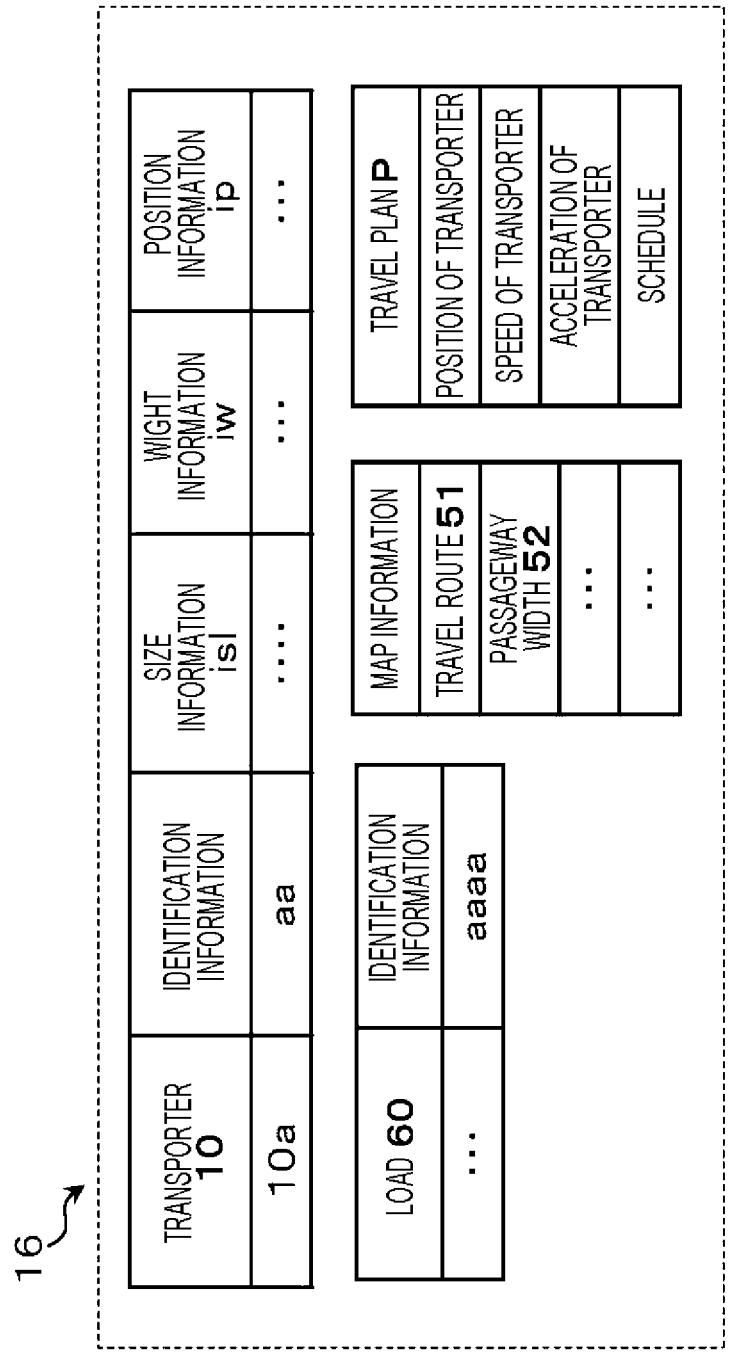
FIG. 8 illustrates an example of information stored on the transporter of the embodiment.

FIG. 8 illustrates an example of information stored on the transporter 10. FIG. 8 illustrates information stored on the memory 16 in the first transporter 10a.

The memory 16 in the first transporter 10a stores information on the first transporter 10a or the like. For example, the memory 16 in the transporter 10 stores the identification information on the transporter 10, the identification information on the load 60 loaded on the transporter 10, the size information isl on the transporter 10, the weight information iw on the transporter 10, the position information ip on the transporter 10, the information on the travel plan P of the transporter 10, and the map information. The transporter 10 acquires from the management apparatus 30 via the communicator 13 the identification information, the size information isl, the weight information iw, the information on the travel plan P and the map information.

The size information isl on the transporter 10 stored on the memory 16 is described below.

Figure 9:
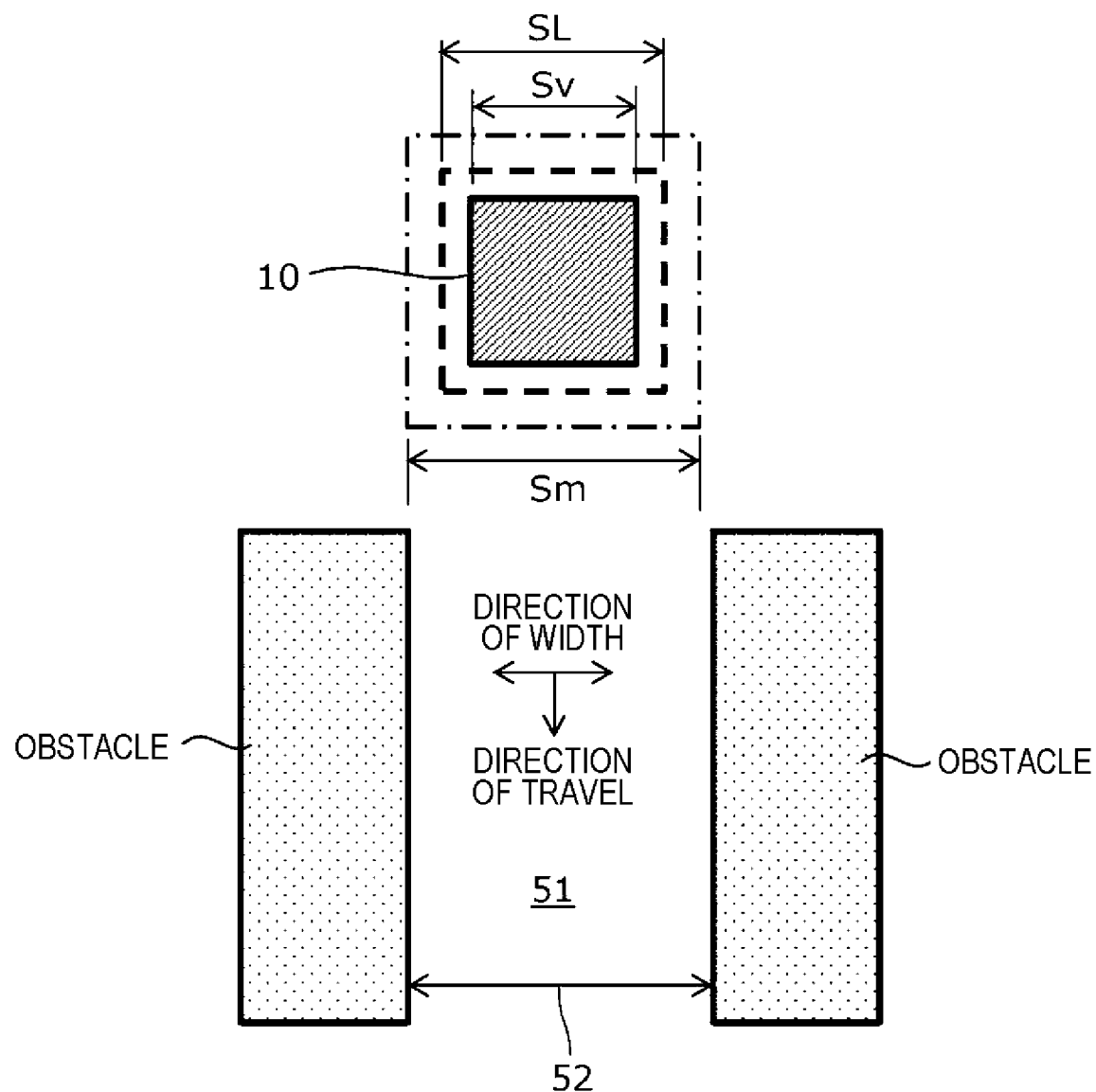
FIG. 9 illustrates a size of the transporter of the embodiment.

FIG. 9 illustrates the size of the transporter 10. Referring to FIG. 9, the transporter 10 is viewed from the ceiling of the building 50.

The size information isl includes three values, namely, the size of the transporter 10 in the width direction, the size of the transporter 10 in the travel direction, and the size of the transporter 10 in a loading direction. The size information isl may also include three sizes, including a unit size Sv of the transporter 10, a loading size SL, and a margin size Sm. The unit size Sv is the size of the transporter 10 without the load 60, the loading size SL is the size of the transporter 10 including the load 60, and the margin size Sm is a size slightly larger than the loading size SL. The three sizes are related as the unit size Sv≤the loading size SL≤the margin size Sm. By setting the margin size Sm to be larger than the loading size SL, the transporter 10 may run with spatial leeway allowed in the load transport system 1. Referring to FIG. 9, the size of the transporter 10 in the width direction is described. The same is true of the size in the travel direction and the size in the loading direction.

The controller 15 causes the transporter 10 to travel while controlling the operation of the driver 17, the first measurer 11, the second measurer 12, the communicator 13 and the memory 16. For example, the controller 15 calculates the margin size Sm in response to the unit size Sv and the loading size SL of the transporter 10 transmitted from the different transporter. The margin size Sm may be calculated by multiplying the loading size SL by a predetermined value and further in this case, the predetermined value as a multiplier may be varied in response to the size or weight of the load 60.

The controller 15 may determine the position coordinates by comparing an object surrounding the transporter 10 measured by the first measurer 11 with the map information stored on the memory 16. The controller 15 may determine the position coordinates in response to the position of a marker on the floor detected by the first measurer 11. Instead of determining the position coordinates from the data measured by the range finder, the controller 15 may determine the position coordinates using a global positioning system (GPS) device and a gyro sensor.

The controller 15 makes the travel plan P in accordance with the size information isl on the first transporter 10*a* output from the second transporter 10*b* and the map information. For example, the controller 15 makes the travel plan P in response to the size of the transporter 10 in the width direction, the passageway width 52 of the travel route 51, and other information. The controller 15 also makes the travel plan P with a margin accounted for in the size of the first transporter 10*a*. The controller 15 further makes the travel plan P in view of the weight information iw on the first transporter 10*a* and the weight information iw on the second transporter 10*b*.

Making the travel plan P includes correcting and updating the travel plan P that has been made beforehand. Making the travel plan P includes verifying the travel plan P that has been made beforehand and then storing the verified travel plan P. According to the embodiment, the controller 15 in the transporter 10 is able to correct and update the travel plan P that has been made by the management apparatus 30. If the travel plan P has not been made yet, the controller 15 in the transporter 10 is able to make the travel plan P from scratch. The controller 15 operates the driver 17 in accordance with the made travel plan P.

Figure 10:
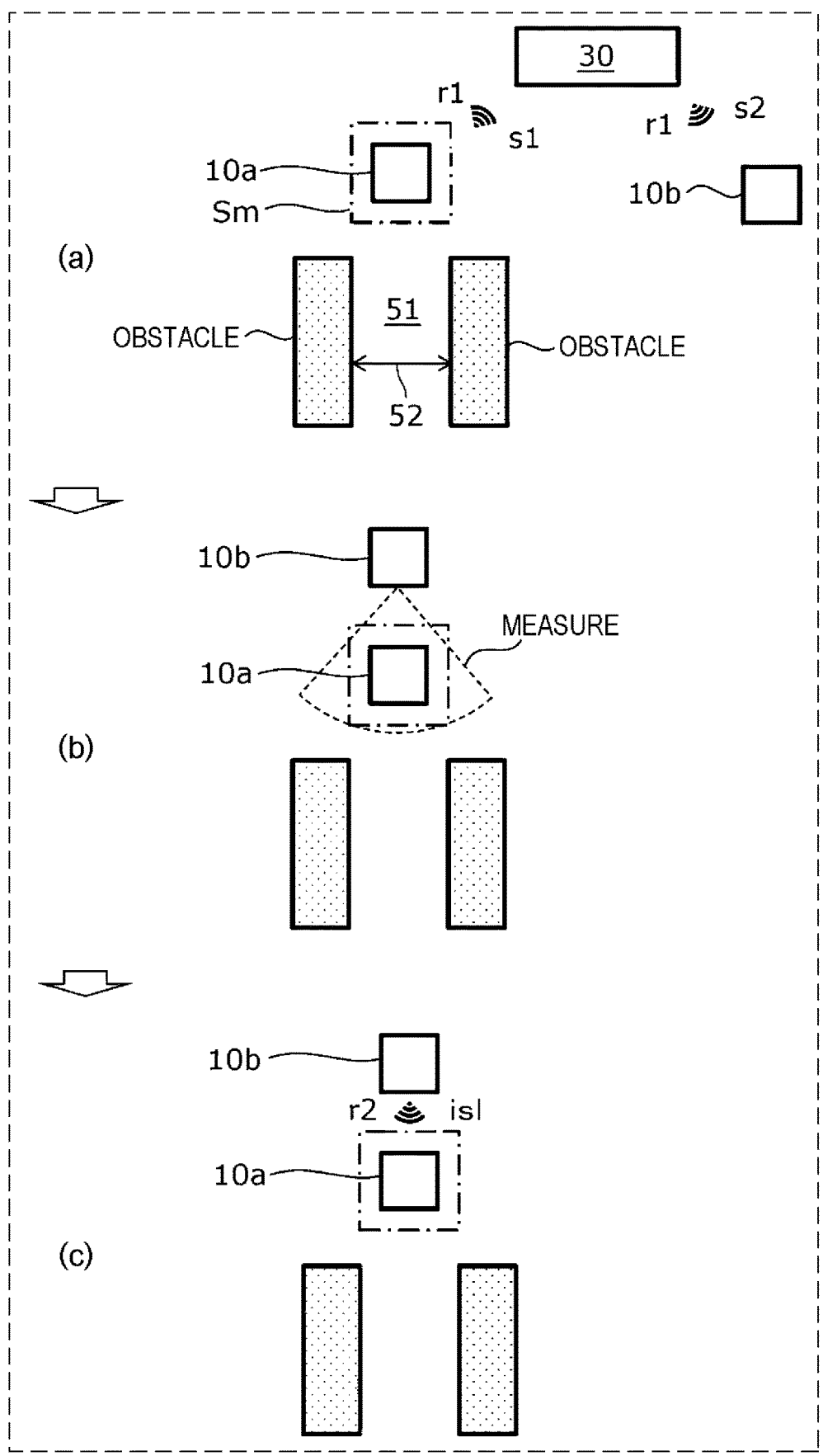
FIG. 10 illustrates an example of an operation of the transporter of the embodiment that travels through a narrower passageway.

FIG. 10 illustrates examples of an operation of the transporter 10 that travels through a narrower passageway. FIG. 10 illustrates a state in which obstacles are present on both sides of the travel route 51, narrowing the passageway width 52 of the travel route 51.

If the passageway width 52 of the travel route 51 of the first transporter 10*a* is narrower in the load transport system 1, the first transporter 10*a* transmits to the management apparatus 30 the measurement request signal s1 requesting the size of the first transporter 10*a* to be measured as illustrated in FIG. 10(*a*). In response to the reception of the measurement request signal s1 from the first transporter 10*a*, the management apparatus 30 transmits the travel instruction signal s2 to the second transporter 10*b*.

After moving in accordance with information included in the travel instruction signal s2, the second transporter 10*b* measures the size of the first transporter 10*a* as illustrated in FIG. 10(*b*). The second transporter 10*b* outputs to the outside the size information isl on the first transporter 10*a* as illustrated in FIG. 10(*c*). The first transporter 10*a* receives the output size information isl and makes the travel plan P in response to the size information isl. This enables the first transporter 10*a* to properly travel through the travel route 51.

Figure 11:
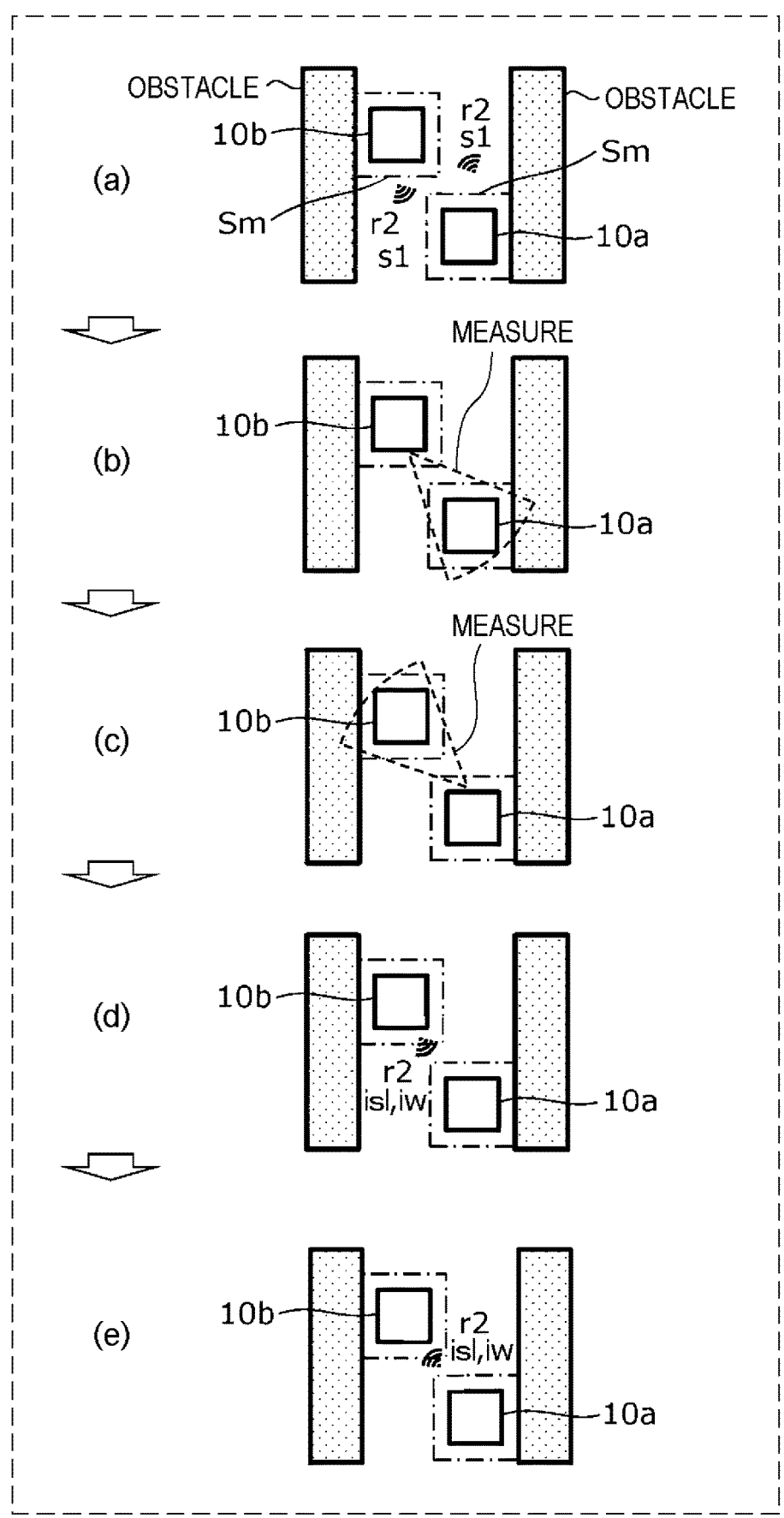
FIG. 11 illustrates an example of an operation of multiple transporters of the embodiment when the transporters pass each other.

FIG. 11 illustrates an example of an operation of multiple transporters 10 that pass each other. FIG. 11 illustrates a state in which obstacles present on both sides of the travel route 51 cause the passageway width 52 to be narrower with two transporters 10*a* and 10*b* present on the travel route 51.

If the first transporter 10*a* and the second transporter 10*b* pass each other on the travel route 51 in the load transport system 1, the first transporter 10*a* and the second transporter 10*b* transmit the measurement request signal s1 to each other as illustrated in FIG. 11(*a*). In response to the reception of the measurement request signal s1 from the first transporter 10*a*, the second transporter 10*b* measures the size of the first transporter 10*a* as illustrated in FIG. 11(*b*). In response to the reception of the measurement request signal s1 from the second transporter 10*b*, the first transporter 10*a* measures the size of the second transporter 10*b* as illustrated in FIG. 11(*c*).

The second transporter 10*b* outputs to the outside the size information isl on the measured first transporter 10*a* as illustrated in FIG. 11(*d*). The first transporter 10*a* outputs to the outside the size information isl on the measured second transporter 10*b* as illustrated in FIG. 11(*e*).

The first transporter 10*a* makes the travel plan P of the first transporter 10*a* in accordance with the size information isl output from the second transporter 10*b* and the size information isl on the second transporter 10*b* measured by the first transporter 10*a*. The second transporter 10*b* makes the travel plan P of the second transporter 10*b* in accordance with the size information isl output from the first transporter 10*a* and the size information isl on the first transporter 10*a* measured by the second transporter 10*b*. In this way, the first transporter 10*a* and the second transporter 10*b* may appropriately travel through the travel route 51.

Example of Operation of Load Transport System

Example of the operation of the load transport system 1 is described with reference to FIG. 12. In this example, the transporter 10 travels through a narrower passageway.

Figure 12:
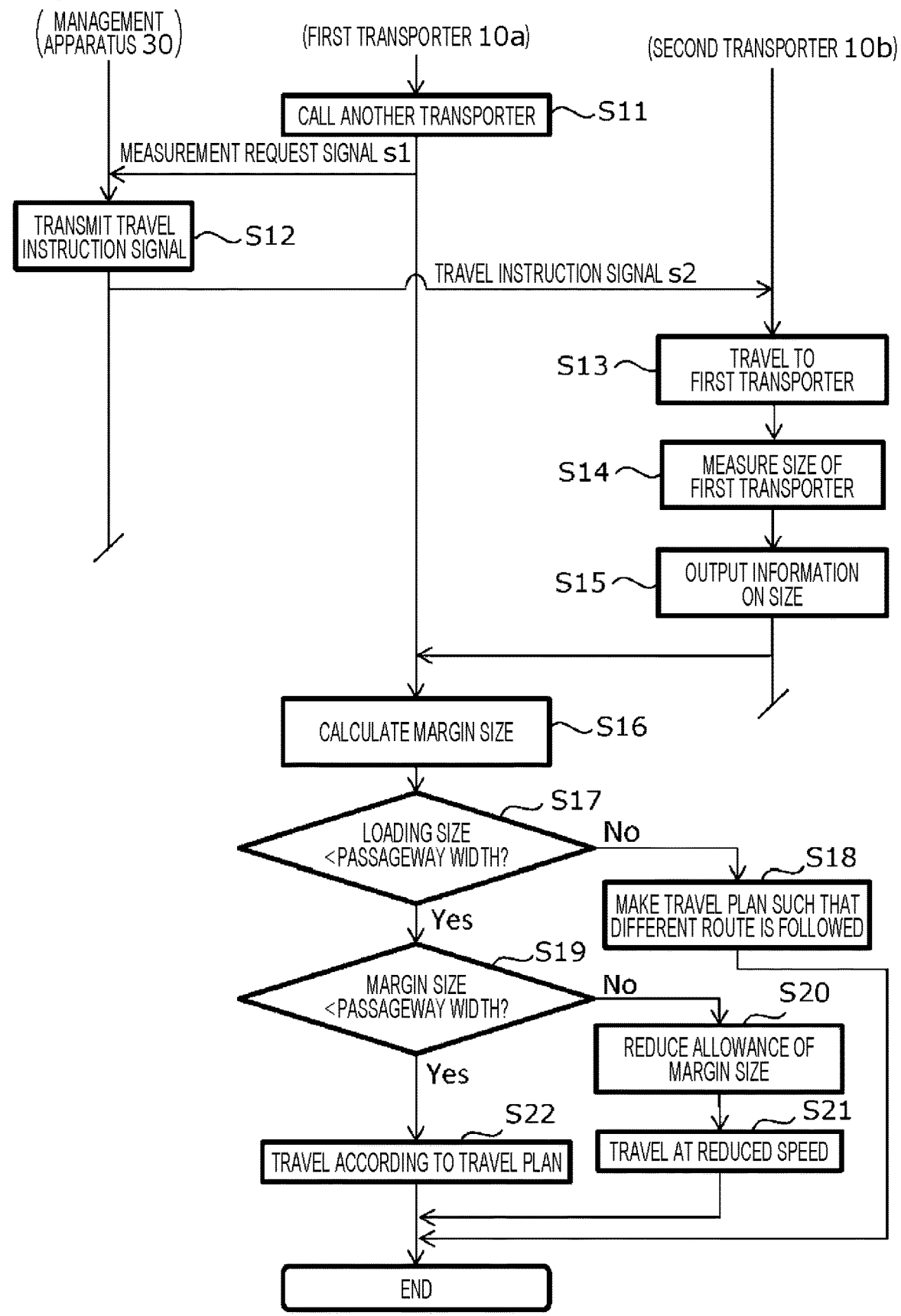
FIG. 12 is a flowchart illustrating an operation of the transporter in the load transport system of the embodiment that travels through a narrower passageway.

FIG. 12 is a flowchart illustrating the operation of the transporter 10 that travels through the narrower passageway in the load transport system 1.

In the load transport system 1, before traveling through a narrow passageway, the first transporter 10*a* calls another transporter that is nearby (step S11). The first transporter 10*a* may determine whether the passageway is narrower by measuring the travel route 51 or the obstacles using the first measurer 11 or by referring to the map information stored on the memory 16. In order to call another transporter, the first transporter 10*a* transmits the measurement request signal s1 to the management apparatus 30 via the radiowave r1 (see FIG. 10(*a*)). The measurement request signal s1 includes the position information ip on the first transporter 10*a*.

Upon receiving the measurement request signal s1, the management apparatus 30 searches for another transporter that is present near the first transporter 10*a* or another transporter that is scheduled to move close to the first transporter 10*a* and the management apparatus 30 determines the second transporter 10*b* that responds to a measurement request requesting the first transporter 10*a* to be measured. The management apparatus 30 transmits the travel instruction signal s2 to the second transporter 10*b* via the radiowave r1 (step S12). The travel instruction signal s2 includes the identification information and the position information ip on the first transporter 10a, and information on the travel route of the first transporter 10a. The travel instruction signal s2 further includes measurement instruction information causing the size of the first transporter 10a to be measured. When the management apparatus 30 transmits the travel instruction signal s2 to the second transporter 10b, the management apparatus 30 may add the position of the first transporter 10a as a waypoint of the travel route 51, remake the travel plan P and transmit the remade travel plan P.

In response to the reception of the travel instruction signal s2, the second transporter 10b moves to the position of the first transporter 10a (step S13). If the management apparatus 30 recognizes in advance that the first transporter 10a is scheduled to travel through a narrower passageway, the management apparatus 30 may determine another transporter that is idling as the second transporter 10b and cause the second transporter 10b to wait on standby for the narrower passageway. The management apparatus 30 may cause the second transporter 10b in the middle of traveling to a destination to wait on standby or may cause the second transporter 10b in the middle of coming back from a destination.

If the first transporter 10a enters a detection region of the first measurer 11, the second transporter 10b measures the size of the first transporter 10a using the first measurer 11 (step S14) (see FIG. 10(b)). The size of the first transporter 10a includes the load 60 loaded on the first transporter 10a. If multiple loads 60 are loaded in an out-of-position state, the size accounts for the out-of-position state of the loads 60. The second transporter 10b may measure the first transporter 10a by going around the first transporter 10a. The second transporter 10b may obtain 360° view data by measuring the first transporter 10a that turns around.

The second transporter 10b outputs, to the outside, information on the size of the first transporter 10a acquired through the measurement (step S15). For example, the second transporter 10b directly transmits the information on the size to the first transporter 10a via the radiowave r2 (see FIG. 10(c)). The signal transmitted to the first transporter 10a includes not only the information on the size but also the identification information on the first transporter 10a. The information on the size of the first transporter 10a may be transferred from the second transporter 10b to the first transporter 10a via the management apparatus 30 via the radiowave r1.

The first transporter 10a receives the information on the size of the first transporter 10a and calculates the margin size Sm or the like (step S16). The margin size Sm may be calculated by multiplying the loading size SL by a predetermined value, and further in this case, the predetermined value as a multiplier may be varied in response to the size or weight of the load 60.

The first transporter 10a makes the travel plan P in response to the passageway width 52 of the travel route 51 of the first transporter 10a and the size information isl on the first transporter 10a.

Specifically, the first transporter 10a determines whether the loading size SL is narrower than the passageway width 52 (step S17).

If the loading size SL is equal to or wider than the passageway width 52 (no path in step S17), the first transporter 10a remakes the travel plan P such that the first transporter 10a travels not through a narrower passageway in the travel direction but through another travel route 51 (step S18). The first transporter 10a may request the management apparatus 30 to search for another travel route 51. If the loading state of the load 60 is substantially different from the initial loading state, the first transporter 10a outputs an alert signal, notifying that the loading state of the load 60 is not normal.

If the loading size SL is narrower than the passageway width 52 (yes path in step S17), the first transporter 10a proceeds to step S19 to determine whether the margin size Sm is narrower than the passageway width 52 (step S19).

If the margin size Sm is equal to or wider than the passageway width 52 (no path in step S19), the first transporter 10a remakes the travel plan P thereof and then travels. Specifically, the first transporter 10a reduces an allowance of the margin size Sm (step S20), reduces the speed of the first transporter 10a, and then travels through the narrower passageway in the travel direction (step S21).

If the margin size Sm is narrower than the passageway width 52 (yes path in step S19), the first transporter 10a travels as planned the travel plan P (step S22). Specifically, the first transporter 10a neither modifies the margin size Sm nor modifies the speed of the first transporter 10a and then travels through the narrower passageway in the travel direction. The speed of the first transporter 10a may be corrected to be slightly slower than the speed planned in the travel plan P.

By executing steps in S11 through S22, the first transporter 10a may appropriately travel through the travel route 51.

Example of Operation of Load Transport System

Example of the operation of the load transport system 1 is described with reference to FIG. 13. In the example, multiple transporters 10 pass each other.

Figure 13:
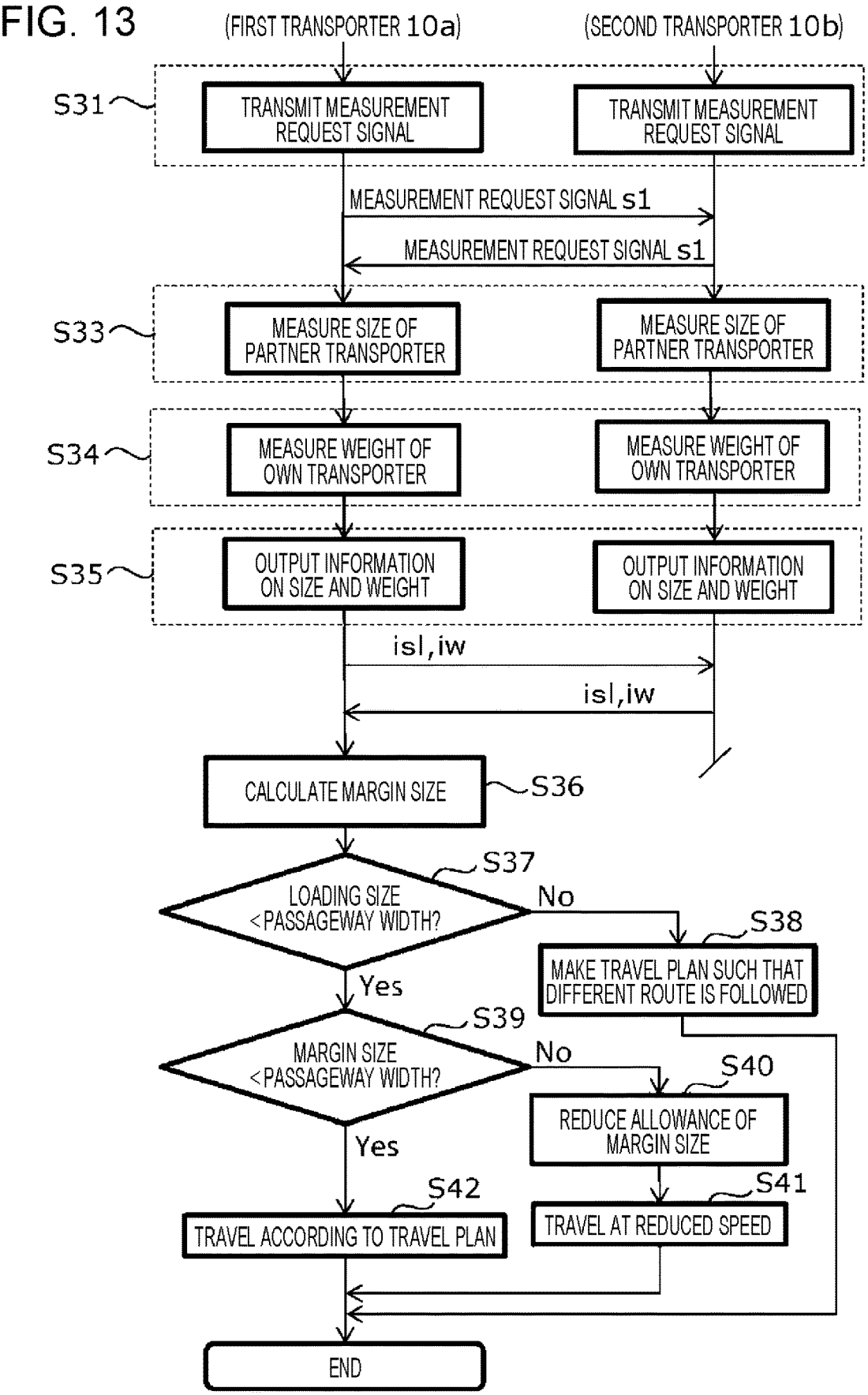
FIG. 13 is a flowchart illustrating an operation of multiple transporters in the load transport system of the embodiment that pass each other.

FIG. 13 is a flowchart illustrating the operation of the load transport system 1 where multiple transporters 10 pass each other.

If the first transporter 10a and the second transporter 10b pass each other in the load transport system 1, the first transporter 10a and the second transporter 10b transmit the measurement request signal s1 to each other to measure their own sizes (step S31). The first transporter 10a and the second transporter 10b may determine whether the transporters are to pass each other, by measuring the travel route 51 or the size of the oncoming transporter with the first measurer 11 or by referring to the map information stored on the memory 16. The first transporter 10a transmits the measurement request signal s1 to the second transporter 10b via the radiowave r2. The second transporter 10b transmits the measurement request signal s1 to the first transporter 10a via the radiowave r2 (see FIG. 11(a)). The measurement request signal s1 may be infrared.

In response to the reception of the measurement request signal s1, each of the first transporter 10a and the second transporter 10b measures the size of each other using respective first measurer 11 (step S33). Specifically, the first transporter 10a measures the size of the second transporter 10b using the first measurer 11 of the first transporter 10a (see FIG. 11(b)). The second transporter 10b also measures the size of the first transporter 10a using the first measurer 11 of the second transporter 10b (see FIG. 11(c)).

In response to the reception of the measurement request signal s1, each of the first transporter 10a and the second transporter 10b measures the weight of thereof using respective second measurer 12 (step S34). Specifically, the first transporter 10a measures the weight of the first transporter 10a using the second measurer 12 of the first transporter 10a and the second transporter 10b measures the weight of the second transporter 10b using the second measurer 12 of the second transporter 10b. The weight measured using the second measurer 12 is the sum of the weight of own transporter and the weight of the load 60.

Each of the first transporter 10a and the second transporter 10b outputs, to the outside, information on the size of the oncoming transporter obtained via the measurement and information on the weight of own transporter (step S35). For example, the first transporter 10a directly transmits to the second transporter 10b via the radiowave r2 information on the size of the second transporter 10b and the weight of the first transporter 10a (see FIG. 11(d)). The second transporter 10b directly transmits to the first transporter 10a via the radiowave r2 information on the size of the first transporter 10a and the weight of the second transporter 10b (see FIG. 11(e)). The information on the size of the oncoming transporter and the weight of own transporter may be transferred to the oncoming transporter via the radiowave r1, namely via the management apparatus 30.

The first transporter 10a and the second transporter 10b may receive the information on the size of own transporter transmitted from the oncoming transporter and calculates the margin size Sm and the like (step S36). The first transporter 10a and the second transporter 10b receive the information on the weight of the oncoming transporter transmitted from the oncoming transporter.

The operation of the first transporter 10a is representatively described.

The first transporter 10a makes the travel plan P in response to the passageway width 52 of the travel route 51 of the first transporter 10a, the size information isl on the second transporter 10b, and the size information isl on the first transporter 10a.

The first transporter 10a determines whether the sum of the loading size SL of the first transporter 10a and the loading size SL of the second transporter 10b is narrower than the passageway width 52 (step S37). If the sum of the loading sizes SL is equal to or wider than the passageway width 52 (no path in step S37), the first transporter 10a remakes the travel plan P such that the first transporter 10a travels not through the passageway in the travel direction but through another travel route 51 (step S38). The first transporter 10a may request the management apparatus 30 to search for another travel route 51. If the loading state of the load 60 is substantially different from the initial loading state, the first transporter 10a outputs an alert signal, notifying that the loading state of the load 60 is not normal.

If the loading size SL is narrower than the passageway width 52 (yes path in step S37), the first transporter 10a proceeds to step S39 to determine whether the sum of the margin size Sm of the first transporter 10a and the margin size Sm of the second transporter 10b is narrower than the passageway width 52 (step S39).

If the sum of the margin sizes Sm is equal to or wider than the passageway width 52 (no path in step S39), the first transporter 10a remakes the travel plan P thereof and then travels. Specifically, the first transporter 10a reduces an allowance of the sum of the margin sizes Sm (step S40), reduces the speed of the first transporter 10a, and then travels passing the second transporter 10b in the travel direction (step S41).

If the sum of the margin sizes Sm is narrower than the passageway width 52 (yes path in step S39), the first transporter 10a travels as planned in the travel plan P (step S42). Specifically, the first transporter 10a neither modifies the sum of the margin sizes Sm nor modifies the speed of the first transporter 10a, and then travels through the narrower passageway in the travel direction.

By executing steps in S31 through S42, the first transporter 10a may appropriately travel through the travel route 51.

The first transporter 10a may make the travel plan P in accordance with the weight information iw on the second transporter 10b output from the second transporter 10b and the weight information iw on the first transporter 10a. If the first transporter 10a determines that the weight of the first transporter 10a is lighter than the weight of the second transporter 10b, the first transporter 10a may modify the travel track of the first transporter 10a.

Conclusions

The load transport system 1 of the exemplary embodiment of the disclosure includes the transporters 10 transporting the loads 60. The transporters 10 include the first transporter 10a and the second transporter 10b. The second transporter 10b measures the size of the first transporter 10a and outputs the size information isl on the size to the outside. The first transporter 10a acquires the size information isl and makes the travel plan P in accordance with the size information isl.

The size of the first transporter 10a may be accurately measured by measuring the size of the first transporter 10a using the second transporter 10b. In accordance with accurate measurement results, the load transport system 1 may make the travel plan P of the first transporter 10a. In this way, the first transporter 10a may appropriately travel through the travel route 51.

The first transporter 10a may make the travel plan P in response to the passageway width 52 of the travel route 51 of the first transporter 10a and the size information isl on the first transporter 10a.

In this way, the load transport system 1 may make the travel plan P of the first transporter 10a in response to the passageway width 52 and the accurate size information isl. In this way, the first transporter 10a may appropriately travel through the travel route 51.

The second transporter 10b may measure the size of the first transporter 10a after acquiring from the outside the travel instruction signal s2 of the second transporter 10b produced in accordance with the position information ip on the first transporter 10a and traveling in response to the travel instruction signal s2.

The size of the first transporter 10a may be accurately measured using the second transporter 10b. The load transport system 1 may thus make the travel plan P of the first transporter 10a in accordance with the accurate measurement results. In this way, the first transporter 10a may appropriately travel through the travel route 51.

The load transport system 1 further includes the management apparatus 30 that manages the first transporter 10a and the second transporter 10b. The first transporter 10a transmits to the management apparatus 30 the measurement request signal s1 that requests the size of the first transporter 10a to be measured. In response to the reception of the measurement request signal s1 from the first transporter 10a, the management apparatus 30 transmits the travel instruction signal s2 to the second transporter 10b.

In the configuration described above, the size of the first transporter 10a may be accurately measured in response to the measurement request signal s1 using the second transporter 10b. In accordance with the accurate measurement results, the load transport system 1 may make the travel plan P of the first transporter 10a. In this way, the first transporter 10a may appropriately travel through the travel route 51.

If the passageway width 52 of the travel route 51 of the first transporter 10a is narrower than a predetermined width, the first transporter 10a may transmit the measurement request signal s1 to the management apparatus 30.

If the passageway width 52 of the travel route 51 of the first transporter 10a is narrower than the predetermined with, the size of the first transporter 10a may be accurately measured using the second transporter 10b. In accordance with the measurement results, the load transport system 1 may make the travel plan P of the first transporter 10a. In this way, the first transporter 10a may appropriately travel through the travel route 51.

The transporter 10 may also include the first measurer 11 that measures the size of another transporter 10 different from the transporter 10, the communicator 13 that communicates with the different transporter 10 and the management apparatus 30, and the controller 15 that controls the first measurer 11 and the communicator 13 and makes the travel plan P.

In this way, the size of the transporter 10 may be accurately measured using the first measurer 11 of the different transporter 10. In accordance with the accurate measurement results, the load transport system 1 may make the travel plan P of the transporter 10. In this way, the transporter 10 may appropriately travel through the travel route 51.

The second transporter 10b may directly transmit the size information isl to the first transporter 10a.

In this configuration, the first transporter 10a may directly receive the size information isl on the first transporter 10a. In accordance with the size information isl, the first transporter 10a may make the travel plan P thereof. In this way, the first transporter 10a may appropriately travel through the travel route 51.

If the first transporter 10a is located in the travel route 51 of the second transporter 10b, the second transporter 10b outputs to the outside the size information isl on the size of the first transporter 10a by measuring the size of the first transporter 10a. The first transporter 10a acquires the size information on the second transporter 10b by measuring the size of the second transporter 10b and acquires the size information isl on the size of the first transporter 10a output from the second transporter 10b. The first transporter 10a may thus make the travel plan P in accordance with the size information isl on the first transporter 10a and the size information isl on the second transporter 10b.

The sizes of the first transporter 10a and the second transporter 10b may be accurately measured by measuring the size of the first transporter 10a using the second transporter 10b and by measuring the size of the second transporter 10b using the first transporter 10a. In accordance with the accurate measurement results, the load transport system 1 may make the travel plan P of the first transporter 10a. In this way, the first transporter 10a may appropriately travel through the travel route 51.

The first transporter 10a may make the travel plan P in response to the passageway width 52 of the travel route 51 of the first transporter 10a, the size information isl on the second transporter 10b and the size information isl on the first transporter 10a.

In this way, the load transport system 1 may make the travel plan P of the first transporter 10a in response to the passageway width 52 and two pieces of more accurate size information isl. In this way, the first transporter 10a may appropriately travel through the travel route 51.

The second transporter 10b may output to the outside the weight information iw on the weight of the second transporter 10b and the first transporter 10a may make the travel plan P in accordance with the weight information iw on the second transporter 10b output from the second transporter 10b and the weight information iw on the first transporter 10a.

The load transport system 1 may thus make the travel plan P of the first transporter 10a in accordance with the weight information iw on the first transporter 10a and the second transporter 10b. In this way, the first transporter 10a may appropriately travel through the travel route 51.

If the first transporter 10a determines that the weight of the first transporter 10a is lighter than the weight of the second transporter 10b, the first transporter 10a may modify the travel track of the first transporter 10a.

By modifying the travel track of the first transporter 10a that is lighter than the second transporter 10b, the first transporter 10a and the second transporter 10b may appropriately travel through the travel route 51.

The transporter 10 may include the first measurer 11 that measures the size of another transporter 10 different from the transporter 10, the second measurer 12 that measures the transporter 10 and the communicator 13 that communicates with the different transporter 10.

In this configuration, the size and the weight of the transporter 10 may be accurately measured using the first measurer 11 of the different transporter 10 and the second measurer 12. In accordance with the accurate measurement results, the load transport system 1 may make the travel plan P of the transporter 10. In this way, the transporter 10 may appropriately travel through the travel route 51.

The second transporter 10b may directly transmit the size information isl and the weight information iw to the first transporter 10a.

In this configuration, the first transporter 10a may directly receive the size information isl on the first transporter 10a and the weight information iw on the second transporter 10b. The first transporter 10a may thus make the travel plan P of the first transporter 10a in accordance with these pieces of information. In this way, the first transporter 10a may appropriately travel through the travel route 51.

The size may include the size of the load 60 transported by the transporter 10.

In this configuration, the size of the first transporter 10a including the load 60 may be accurately measured. In accordance with the accurate measurement results, the load transport system 1 may make the travel plan P of the first transporter 10a. In this way, the first transporter 10a may appropriately travel through the travel route 51.

The first transporter 10a may make the travel plan P with a margin accounted for in the size.

In this configuration, the load transport system 1 may make the travel plan P of the first transporter 10a with spatial leeway allowed. In this way, the first transporter 10a may appropriately travel through the travel route 51.

The travel plan P may include at least one piece of information selected from the group consisting of the travel track of the transporter 10, the speed of the transporter 10, and the size information isl on the transporter 10.

In this way, the load transport system 1 may make the travel plan P that accounts for at least one piece of the information selected from the group consisting of the travel track of the transporter 10, the speed of the transporter 10, and the size information isl on the transporter 10. In this way, the first transporter 10a may appropriately travel through the travel route 51.

The transporter 10 of the embodiment transporting the load 60 includes the communicator 13 that communicates with another transporter 10 that is different from the transporter 10, and the controller 15 that acquires the size information isl on the size of the transporter 10 via the communicator 13 and makes the travel plan P of the transporter 10 in accordance with the size information isl.

The size of the transporter 10 may be accurately measured by acquiring the size information isl on the transporter 10 via the communicator 13. In accordance with the accurate measurement results, the transporter 10 may make the travel plan P of the transporter 10. In this way, the transporter 10 may appropriately travel through the travel route 51.

The transporter 10 of the embodiment transporting the load 60 includes the first measurer 11 that measures the size of another transporter 10 that is different from the transporter 10, and the communicator 13 that outputs the size information isl on the size measured by the first measurer 11 in order to cause the different transporter 10 to acquire the size information isl.

The transporter 10 outputs the size of the different transporter 10 via the communicator 13 such that the different transporter 10 may measure the size of the different transporter 10. In accordance with the accurate measurement results, the different transporter 10 may make the travel plan P of the different transporter 10. In this way, the different transporter 10 may appropriately travel through the travel route 51.

Other Embodiments

The embodiment and modifications (referred to as embodiments) have been described. The disclosure is not limited to the embodiments.

The transporter 10 may include a load holding unit that restricts the displacement of loads during traveling. The load holding unit may be a secured member or a member that may be moved in response to the size of the load.

Generic or specific form of the disclosure may be implemented by a system, an apparatus, a method, an integrated circuit, a computer program, or a recording medium, such as a compact disc read-only memory (CD-ROM). The generic or specific form of the disclosure may be implemented by a combination of the system, the apparatus, the method, the integrated circuit, the computer program and the recording medium.

An order of operations described with reference to the flowcharts in the embodiments is described for exemplary purposes only. The order of operations may be modified and multiple operations may be concurrently performed.

The function blocks in the block diagrams are delineated for exemplary purposes only. Multiple function blocks may be integrated into a single function block, a function block may be segmented into multiple blocks, or a function of one block may be transferred to another block. Similar functions of multiple function blocks may be performed in parallel or in a time-division manner by a single hardware element or a software element.

According to the embodiments, the elements (such as a processor like the controller) may be implemented by a dedicated hardware element or may be implemented by a software program appropriate for the elements. The elements may be implemented when a program executing unit, such as a central processing unit (CPU) or a processor, reads the software program from the recording medium, such as a hard disk or a semiconductor memory, and executes the read software program. Each element may be a circuit (or an integrated circuit). These circuits may form a unitary circuit or separate circuits. These circuits may be a general-purpose circuit or a specialized circuit.

Those skilled in the art may devise an embodiment without departing from the scope of the disclosure by modifying the above-described embodiments, or by combining the elements or the functions in each of the embodiments. Such resulting embodiment also falls within the scope of the disclosure.

The disclosure may be widely applicable as a load transport system that includes a transporter autonomously transporting a load.

What is claimed is:

1. A load transport system comprising a plurality of transporters transporting a load, respectively, and including a first transporter and a second transporter,
    wherein, when the first transporter is located in a travel route of the second transporter, the second transporter measures a size of the first transporter and outputs, to outside, size information on the size of the first transporter,
    wherein the first transporter acquires the size information on the size of the first transporter output from the second transporter, acquires size information on a size of the second transporter by measuring the size of the second transporter, and makes a travel plan of the first transporter in accordance with the size information on the first transporter and the size information on the second transporter.

2. The load transport system according to claim 1, wherein the first transporter makes the travel plan in response to a passageway width of a travel route of the first transporter and the size information.

3. The load transport system according to claim 1, wherein the second transporter measures the size of the first transporter after acquiring from the outside a travel instruction signal of the second transporter generated in response to position information on the first transporter and traveling in response to the travel instruction signal.

4. The load transport system according to claim 3, further comprising a management apparatus that manages the first transporter and the second transporter,
    wherein the first transporter transmits to the management apparatus a measurement request signal requesting the size of the first transporter to be measured, and
    wherein the management apparatus transmits the travel instruction signal to the second transporter if the measurement request signal is received from the first transporter.

5. The load transport system according to claim 4, wherein the first transporter transmits the measurement request signal to the management apparatus if the passageway width of the travel route of the first transporter is narrower than a predetermined width.

6. The load transport system according to claim 4, wherein the first transporter comprises a measurer that measures a size of another transporter different from the first transporter, a communicator that communicates with the different transporter and the management apparatus and a controller that controls the measurer and the communicator and makes the travel plan.

7. The load transport system according to claim 1, wherein the second transporter directly transmits the size information to the first transporter.

8. The load transport system according to claim 1, wherein the first transporter makes the travel plan in accordance with the passageway width of the travel route of the first transporter, the size information on the second transporter and the size information on the first transporter.

9. The load transport system according to claim 1,
wherein the second transporter further outputs weight information on a weight of the second transporter to the outside, and
wherein the first transporter makes the travel plan in accordance with the weight information output from the second transporter and weight information on a weight of the first transporter.

10. The load transport system according to claim 9, wherein the first transporter modifies a travel track of the first transporter if the first transporter determines that the weight of the first transporter is lighter than the weight of the second transporter.

11. The load transport system according to claim 9, wherein the transporter comprises a first measurer that measures a size of another transporter different from the transporter, a second measurer that measures a weight of the transporter, and a communicator that communicates with the different transporter.

12. The load transport system according to claim 9, wherein the second transporter directly transmits the size information and the weight information to the first transporter.

13. The load transport system according to claim 1, wherein the size comprises a size of the load transported by the transporter.

14. The load transport system according to claim 13, wherein the first transporter makes the travel plan with a margin accounted for in the size.

15. The load transport system according to claim 1, wherein the travel plan comprises at least one piece of information on a track of the transporter, information on a speed of the transport or the size information.

16. A method implemented by a load transport system including a plurality of transporters transporting a load, respectively, and including a first transporter and a second transporter, the method comprising:
upon determining that the first transporter is located in a travel route of the second transporter, measuring, by the second transporter, a size of the first transporter and outputting, to outside, size information on the size of the first transporter;
acquiring, by the first transporter, the size information on the size of the first transporter output from the second transporter;
acquiring, by the first transporter, size information on a size of the second transporter by measuring the size of the second transporter; and
making, by the first transporter, a travel plan of the first transporter in accordance with the size information on the first transporter and the size information on the second transporter.

17. The load transport system according to claim 1, wherein the second transporter measures a size of the first transporter upon receiving a request signal requesting the size of the first transporter to be measured output from the first transporter.

18. The method of the load transport system according to claim 16, wherein the second transporter measures a size of the first transporter upon receiving a request signal requesting the size of the first transporter to be measured output from the first transporter.

* * * * *